US008286229B2

(12) United States Patent
Bodin et al.

(10) Patent No.: US 8,286,229 B2
(45) Date of Patent: Oct. 9, 2012

(54) TOKEN-BASED CONTENT SUBSCRIPTION

(75) Inventors: William K. Bodin, Austin, TX (US);
David Jaramillo, Lake Worth, FL (US);
Jesse W. Redman, Cedar Park, TX (US);
Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 11/420,017

(22) Filed: May 24, 2006

(65) Prior Publication Data

US 2007/0277233 A1    Nov. 29, 2007

(51) Int. Cl.
    *H04L 29/66* (2006.01)
(52) U.S. Cl. ........... 726/10; 726/1; 726/2; 726/3; 726/4; 726/26; 726/27; 726/28; 726/29; 726/30; 713/155; 713/156; 713/159; 713/172; 709/217; 709/219; 709/225; 709/226; 709/229; 705/64; 705/65; 705/66; 705/76
(58) Field of Classification Search .............. 726/2–10, 726/16–21, 26–30; 709/203, 217–219, 223–232; 707/2, 100; 705/51, 64–66, 76–78; 713/155–159, 713/168–172
    See application file for complete search history.

(56) References Cited

U.S. PATENT DOCUMENTS

| 5,819,220 | A | 10/1998 | Sarukkai et al. |
| 5,892,825 | A | 4/1999 | Mages et al. |
| 5,901,287 | A | 5/1999 | Bull et al. |
| 5,911,776 | A | 6/1999 | Guck |
| 6,032,260 | A * | 2/2000 | Sasmazel et al. ........... 726/10 |
| 6,141,693 | A | 10/2000 | Perlman et al. |
| 6,178,511 | B1 | 1/2001 | Cohen et al. |
| 6,240,391 | B1 | 5/2001 | Ball et al. |
| 6,266,649 | B1 | 7/2001 | Linden et al. |
| 6,311,194 | B1 | 10/2001 | Sheth et al. |
| 6,463,440 | B1 | 10/2002 | Hind et al. |
| 6,519,617 | B1 | 2/2003 | Wanderski et al. |
| 6,771,743 | B1 | 8/2004 | Butler et al. |
| 6,912,691 | B1 | 6/2005 | Dodrill et al. |
| 6,944,591 | B1 | 9/2005 | Raghunandan |
| 6,965,569 | B1 | 11/2005 | Carolan et al. |
| 6,976,082 | B1 | 12/2005 | Ostermann et al. |
| 6,993,476 | B1 | 1/2006 | Dutta et al. |
| 7,017,188 | B1 * | 3/2006 | Schmeidler et al. ........... 726/26 |

(Continued)

FOREIGN PATENT DOCUMENTS

WO    WO 0182139    11/2001

(Continued)

OTHER PUBLICATIONS

Token-based authorization of connection oriented network resources by Gommans et al; Publisher: Universiteit van Amsterdam; Year: 2004.*

(Continued)

*Primary Examiner* — Taghi Arani
*Assistant Examiner* — Madhuri Herzog
(74) *Attorney, Agent, or Firm* — Brevetto Law Group

(57) ABSTRACT

Methods, systems, and computer program products are provided for token-based content subscription. Embodiments include receiving a request for content subscription; receiving from a user a subscription token; and delivering content to a device associated with the subscription token.

24 Claims, 8 Drawing Sheets

U.S. PATENT DOCUMENTS

| | | |
|---|---|---|
| 7,039,643 B2 | 5/2006 | Sena et al. |
| 7,046,772 B1 | 5/2006 | Moore et al. |
| 7,062,437 B2 | 6/2006 | Kovales et al. |
| 7,120,702 B2 | 10/2006 | Huang et al. |
| 7,130,850 B2 | 10/2006 | Russell-Falla et al. |
| 7,171,411 B1 | 1/2007 | Lewis et al. |
| 7,313,528 B1 | 12/2007 | Miller |
| 7,356,470 B2 | 4/2008 | Roth et al. |
| 7,366,712 B2 | 4/2008 | He et al. |
| 7,454,346 B1 | 11/2008 | Dodrill et al. |
| 7,657,006 B2 | 2/2010 | Woodring |
| 2001/0027396 A1 | 10/2001 | Sato |
| 2001/0040900 A1 | 11/2001 | Salmi et al. |
| 2001/0047349 A1 | 11/2001 | Easty et al. |
| 2001/0049725 A1 | 12/2001 | Kosuge |
| 2001/0054074 A1 | 12/2001 | Hayashi |
| 2002/0013708 A1 | 1/2002 | Walker et al. |
| 2002/0032564 A1 | 3/2002 | Ehsani et al. |
| 2002/0032776 A1 | 3/2002 | Hasegawa et al. |
| 2002/0054090 A1 | 5/2002 | Silva et al. |
| 2002/0062216 A1 | 5/2002 | Guenther et al. |
| 2002/0062393 A1 | 5/2002 | Borger et al. |
| 2002/0083013 A1* | 6/2002 | Rollins et al. ............. 705/76 |
| 2002/0095292 A1 | 7/2002 | Mittal et al. |
| 2002/0152210 A1 | 10/2002 | Johnson et al. |
| 2002/0178007 A1 | 11/2002 | Slotznick et al. |
| 2002/0194286 A1 | 12/2002 | Matsuura et al. |
| 2002/0194480 A1 | 12/2002 | Nagao |
| 2002/0198720 A1 | 12/2002 | Takagi et al. |
| 2003/0028380 A1 | 2/2003 | Freeland et al. |
| 2003/0033331 A1 | 2/2003 | Sena et al. |
| 2003/0055868 A1 | 3/2003 | Fletcher et al. |
| 2003/0103606 A1 | 6/2003 | Rhie et al. |
| 2003/0110272 A1 | 6/2003 | du Castel et al. |
| 2003/0110297 A1 | 6/2003 | Tabatabai et al. |
| 2003/0115056 A1 | 6/2003 | Gusler et al. |
| 2003/0115064 A1 | 6/2003 | Gusler et al. |
| 2003/0126293 A1 | 7/2003 | Bushey |
| 2003/0132953 A1 | 7/2003 | Johnson et al. |
| 2003/0158737 A1 | 8/2003 | Csicsatka |
| 2003/0160770 A1 | 8/2003 | Zimmerman |
| 2003/0167234 A1* | 9/2003 | Bodmer et al. ............. 705/51 |
| 2003/0172066 A1 | 9/2003 | Cooper et al. |
| 2003/0188255 A1 | 10/2003 | Shimizu et al. |
| 2003/0229847 A1 | 12/2003 | Kim |
| 2004/0003394 A1 | 1/2004 | Ramaswamy |
| 2004/0034653 A1 | 2/2004 | Maynor et al. |
| 2004/0041835 A1 | 3/2004 | Lu |
| 2004/0054915 A1* | 3/2004 | Jong et al. ............. 713/193 |
| 2004/0068552 A1 | 4/2004 | Kotz et al. |
| 2004/0088349 A1* | 5/2004 | Beck et al. ............. 709/203 |
| 2004/0199375 A1 | 10/2004 | Ehsani et al. |
| 2004/0201609 A1 | 10/2004 | Obrador |
| 2004/0254851 A1 | 12/2004 | Himeno et al. |
| 2005/0015254 A1 | 1/2005 | Beaman |
| 2005/0045373 A1 | 3/2005 | Born |
| 2005/0071780 A1 | 3/2005 | Muller et al. |
| 2005/0076365 A1 | 4/2005 | Popov et al. |
| 2005/0108521 A1 | 5/2005 | Silhavy et al. |
| 2005/0203959 A1 | 9/2005 | Muller et al. |
| 2005/0232242 A1 | 10/2005 | Karaoguz et al. |
| 2005/0251513 A1 | 11/2005 | Tenazas |
| 2006/0008258 A1 | 1/2006 | Kawana et al. |
| 2006/0020662 A1 | 1/2006 | Robinson |
| 2006/0048212 A1* | 3/2006 | Tsuruoka et al. ............. 726/4 |
| 2006/0050794 A1 | 3/2006 | Tan et al. |
| 2006/0052089 A1 | 3/2006 | Khurana et al. |
| 2006/0075224 A1 | 4/2006 | Tao |
| 2006/0095848 A1 | 5/2006 | Naik |
| 2006/0114987 A1 | 6/2006 | Roman |
| 2006/0123082 A1 | 6/2006 | Digate et al. |
| 2006/0136449 A1 | 6/2006 | Parker et al. |
| 2006/0140360 A1 | 6/2006 | Crago et al. |
| 2006/0149781 A1 | 7/2006 | Blankinship |
| 2006/0155698 A1 | 7/2006 | Vayssiere |
| 2006/0159109 A1 | 7/2006 | Lamkin et al. |
| 2006/0168507 A1 | 7/2006 | Hansen |
| 2006/0173985 A1 | 8/2006 | Moore |
| 2006/0184679 A1 | 8/2006 | Izdepski et al. |
| 2006/0190616 A1* | 8/2006 | Mayerhofer et al. ......... 709/231 |
| 2006/0206533 A1 | 9/2006 | MacLaurin et al. |
| 2006/0224739 A1 | 10/2006 | Anantha |
| 2006/0233327 A1 | 10/2006 | Roberts et al. |
| 2006/0265503 A1 | 11/2006 | Jones et al. |
| 2006/0282317 A1 | 12/2006 | Rosenberg |
| 2006/0288011 A1 | 12/2006 | Gandhi et al. |
| 2007/0027958 A1 | 2/2007 | Haslam |
| 2007/0043759 A1 | 2/2007 | Bodin et al. |
| 2007/0061229 A1 | 3/2007 | Ramer et al. |
| 2007/0061266 A1 | 3/2007 | Moore et al. |
| 2007/0073728 A1 | 3/2007 | Klein et al. |
| 2007/0077921 A1 | 4/2007 | Hayashi et al. |
| 2007/0078655 A1 | 4/2007 | Semkow et al. |
| 2007/0083540 A1 | 4/2007 | Gundla et al. |
| 2007/0091206 A1 | 4/2007 | Bloebaum |
| 2007/0100836 A1 | 5/2007 | Eichstaedt et al. |
| 2007/0112844 A1 | 5/2007 | Tribble et al. |
| 2007/0118426 A1 | 5/2007 | Barnes, Jr. |
| 2007/0118608 A1* | 5/2007 | Egli ............. 709/217 |
| 2007/0124458 A1* | 5/2007 | Kumar ............. 709/224 |
| 2007/0124802 A1 | 5/2007 | Anton et al. |
| 2007/0130589 A1 | 6/2007 | Davis et al. |
| 2007/0147274 A1 | 6/2007 | Vasa et al. |
| 2007/0174326 A1 | 7/2007 | Schwartz et al. |
| 2007/0191008 A1 | 8/2007 | Bucher et al. |
| 2007/0192327 A1 | 8/2007 | Bodin |
| 2007/0192674 A1 | 8/2007 | Bodin |
| 2007/0192683 A1 | 8/2007 | Bodin |
| 2007/0192684 A1 | 8/2007 | Bodin et al. |
| 2007/0208687 A1 | 9/2007 | O'Connor et al. |
| 2007/0213857 A1 | 9/2007 | Bodin |
| 2007/0213986 A1 | 9/2007 | Bodin |
| 2007/0214147 A1 | 9/2007 | Bodin et al. |
| 2007/0214148 A1 | 9/2007 | Bodin |
| 2007/0214149 A1 | 9/2007 | Bodin |
| 2007/0214485 A1 | 9/2007 | Bodin |
| 2007/0220024 A1 | 9/2007 | Putterman et al. |
| 2007/0253699 A1 | 11/2007 | Yen et al. |
| 2007/0276837 A1 | 11/2007 | Bodin et al. |
| 2007/0276865 A1 | 11/2007 | Bodin et al. |
| 2007/0276866 A1 | 11/2007 | Bodin et al. |
| 2007/0277088 A1 | 11/2007 | Bodin |
| 2007/0277233 A1 | 11/2007 | Bodin |
| 2008/0034278 A1 | 2/2008 | Tsou et al. |
| 2008/0052415 A1 | 2/2008 | Kellerman et al. |
| 2008/0082576 A1 | 4/2008 | Bodin |
| 2008/0082635 A1 | 4/2008 | Bodin |
| 2008/0161948 A1 | 7/2008 | Bodin |
| 2008/0162131 A1 | 7/2008 | Bodin |
| 2008/0275893 A1 | 11/2008 | Bodin et al. |

FOREIGN PATENT DOCUMENTS

| | | |
|---|---|---|
| WO | WO 2005/106846 | 11/2005 |

OTHER PUBLICATIONS

Text to Speech MP3 with Natural Voices 1.71, Published Oct. 5, 2004.

Managing multimedia content and delivering services across multiple client platforms using XML, London Communications Symposium, xx, xx, Sep. 10, 2002, pp. 1-7.

PCT Search Report and Written Opinion International Application PCT/EP2007/050594.

Adapting Multimedia Internet Content for Universal Access, Rakesh Mohan, John R. Smith, Chung-Sheng Li, IEEE Transactions on Multimedia vol. 1, No. 1, p. 104-p. 144.

Office Action Dated May 24, 2006 in U.S. Appl. No. 11/420,018.
Office Action Dated Sep. 29, 2006 in U.S. Appl. No. 11/536,733.
Office Action Dated Jan. 3, 2007 in U.S. Appl. No. 11/619,253.
Office Action Dated May 24, 2006 in U.S. Appl. No. 11/420,016.
Office Action Dated May 24, 2006 in U.S. Appl. No. 11/420,015.
Office Action Dated Mar. 9, 2006 in U.S. Appl. No. 11/372,318.
Office Action Dated Mar. 9, 2006 in U.S. Appl. No. 11/372,329.
Office Action Dated Mar. 9, 2006 in U.S. Appl. No. 11/372,325.
Office Action Dated Mar. 9, 2006 in U.S. Appl. No. 11/372,323.

Office Action Dated Feb. 13, 2006 in U.S. Appl. No. 11/352,679.
Office Action Dated Feb. 13, 2006 in U.S. Appl. No. 11/352,824.
Office Action Dated Feb. 13, 2006 in U.S. Appl. No. 11/352,760.
Office Action Dated Jun. 23, 2009 in U.S. Appl. No. 11/352,680.
Office Action Dated Jul. 8, 2009 in U.S. Appl. No. 11/372,317.
Final Office Action Dated Jul. 22, 2009 in U.S. Appl. No. 11/536,733.
Office Action Dated Jul. 9, 2009 in U.S. Appl. No. 11/420,017.
Office Action Dated Jul. 17, 2009 in U.S. Appl. No. 11/536,781.
Office Action Dated Jul. 23, 2009 in U.S. Appl. No. 11/420,014.
Final Office Action Dated Jul. 21, 2009 in U.S. Appl. No. 11/420,018.
U.S. Appl. No. 11/352,760, filed Feb. 2006, Bodin, et al.
U.S. Appl. No. 11/352,824, filed Feb. 2006, Bodin, et al.
U.S. Appl. No. 11/352,680, filed Feb. 2006, Bodin, et al.
U.S. Appl. No. 11/352,679, filed Feb. 2006, Bodin, et al.
U.S. Appl. No. 11/372,323, filed Mar. 2006, Bodin, et al.
U.S. Appl. No. 11/372,318, filed Mar. 2006, Bodin, et al.
U.S. Appl. No. 11/372,319, filed Mar. 2006, Bodin, et al.
U.S. Appl. No. 11/536,781, filed Sep. 2006, Bodin, et al.
U.S. Appl. No. 11/420,014, filed May 2006, Bodin, et al.
U.S. Appl. No. 11/420,015, filed May 2006, Bodin, et al.
U.S. Appl. No. 11/420,016, filed May 2006, Bodin, et al.
U.S. Appl. No. 11/420,017, filed May 2006, Bodin, et al.
U.S. Appl. No. 11/420,018, filed May 2006, Bodin, et al.
U.S. Appl. No. 11/536,733, filed Sep. 2006, Bodin, et al.
U.S. Appl. No. 11/619,216, filed Jan. 2007, Bodin, et al.
U.S. Appl. No. 11/619,253, filed Jan. 2007, Bodin, et al.
U.S. Appl. No. 12/178,448, filed Jul. 2008, Bodin, et al.
Office Action Dated Apr. 15, 2009 in U.S. Appl. No. 11/352,760.
Final Office Action Dated Nov. 16, 2009 in U.S. Appl. No. 11/352,760.
Notice of Allowance Dated Jun. 5, 2008 in U.S. Appl. No. 11/352,824.
Office Action Dated Jan. 22, 2008 in U.S. Appl. No. 11/352,824.
Final Office Action Dated Dec. 21, 2009 in U.S. Appl. No. 11/352,680.
Office Action Dated Apr. 30, 2009 in U.S. Appl. No. 11/352,679.
Final Office Action Dated Oct. 29, 2009 in U.S. Appl. No. 11/352,679.
Office Action Dated Oct. 28, 2008 in U.S. Appl. No. 11/372,323.
Office Action Dated Mar. 18, 2008 in U.S. Appl. No. 11/372,318.
Final Office Action Dated Jul. 9, 2008 in U.S. Appl. No. 11/372,318.
Final Office Action Dated Nov. 6, 2009 in U.S. Appl. No. 11/372,329.
Office Action Dated Feb. 25, 2009 in U.S. Appl. No. 11/372,325.
Office Action Dated Feb. 27, 2009 in U.S. Appl. No. 11/372,329.
Final Office Action Dated Jan. 15, 2010 in U.S. Appl. No. 11/536,781.
Office Action Dated Mar. 20, 2008 in U.S. Appl. No. 11/420,015.
Final Office Action Dated Sep. 3, 2008 in U.S. Appl. No. 11/420,015.
Office Action Dated Dec. 2, 2008 in U.S. Appl. No. 11/420,015.
Office Action Dated Mar. 3, 2008 in U.S. Appl. No. 11/420,016.
Final Office Action Dated Aug. 29, 2008 in U.S. Appl. No. 11/420,016.
Final Office Action Dated Dec. 31, 2009 in U.S. Appl. No. 11/420,017.
Office Action Dated Mar. 21, 2008 in U.S. Appl. No. 11/420,018.
Final Office Action Dated Aug. 29, 2008 in U.S. Appl. No. 11/420,018.
Office Action Dated Dec. 3, 2008 in U.S. Appl. No. 11/420,018.
Office Action Dated Dec. 30, 2008 in U.S. Appl. No. 11/536,733.
Office Action Dated Jan. 26, 2010 in U.S. Appl. No. 11/619,216.
Office Action Dated Apr. 2, 2009 in U.S. Appl. No. 11/619,253.
Buchana et al., "Representing Aggregated Works in the Digital Library", ACM, 2007, pp. 247-256.
Office Action U.S. Appl. No. 11/352,760 Mailed Sep. 16, 2010.
Office Action U.S. Appl. No. 11/352,680 Mailed Jun. 10, 2010.
Final Office Action U.S. Appl. No. 11/352,680 Mailed Sep. 7, 2010.
Office Action U.S. Appl. No. 11/352,679 Mailed May 28, 2010.
Final Office Action U.S. Appl. No. 11/352,679 Mailed Nov. 15, 2010.
Office Action U.S. Appl. No. 11/372,317 Mailed Sep. 23, 2010.
Final Office Action U.S. Appl. No. 11/372,329 Mailed Nov. 6, 2009.
Office Action U.S. Appl. No. 11/372,319 Mailed Apr. 21, 2010.
Final Office Action U.S. Appl. No. 11/372,319 Mailed Jul. 2, 2010.
Final Office Action U.S. Appl. No. 11/420,014 Mailed Apr. 3, 2010.
Final Office Action U.S. Appl. No. 11/420,017 Mailed Sep. 23, 2010.
Final Office Action U.S. Appl. No. 11/619,216 Mailed Jun. 25, 2010.
Final Office Action U.S. Appl. No. 11/619,236 Mailed Oct. 22, 2010.
Office Action U.S. Appl. No. 12/178,448 Mailed Apr. 2, 2010.
Final Office Action U.S. Appl. No. 12/178,448 Mailed Sep. 14, 2010.

* cited by examiner

TOKEN-BASED CONTENT SUBSCRIPTION

BACKGROUND OF THE INVENTION

1. Field of the Invention

The field of the invention is data processing, or, more specifically, methods, systems, and products for content subscription.

2. Description of Related Art

Subscribing to content provided by content providers such as RSS content or podcasts, for example, currently requires a user to download to a client device an aggregator provided by the specific content provider. Current content subscription also requires the user to subscribe to the content with the target device such that the aggregator may be downloaded to the device during subscription. Furthermore, current content subscription also typically requires subscription to each content provider individually. There is therefore an ongoing need for improvement in content subscription.

SUMMARY OF THE INVENTION

Methods, systems, and computer program products are provided for token-based content subscription. Embodiments include receiving a request for content subscription; receiving from a user a subscription token; and delivering content to a device associated with the subscription token.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
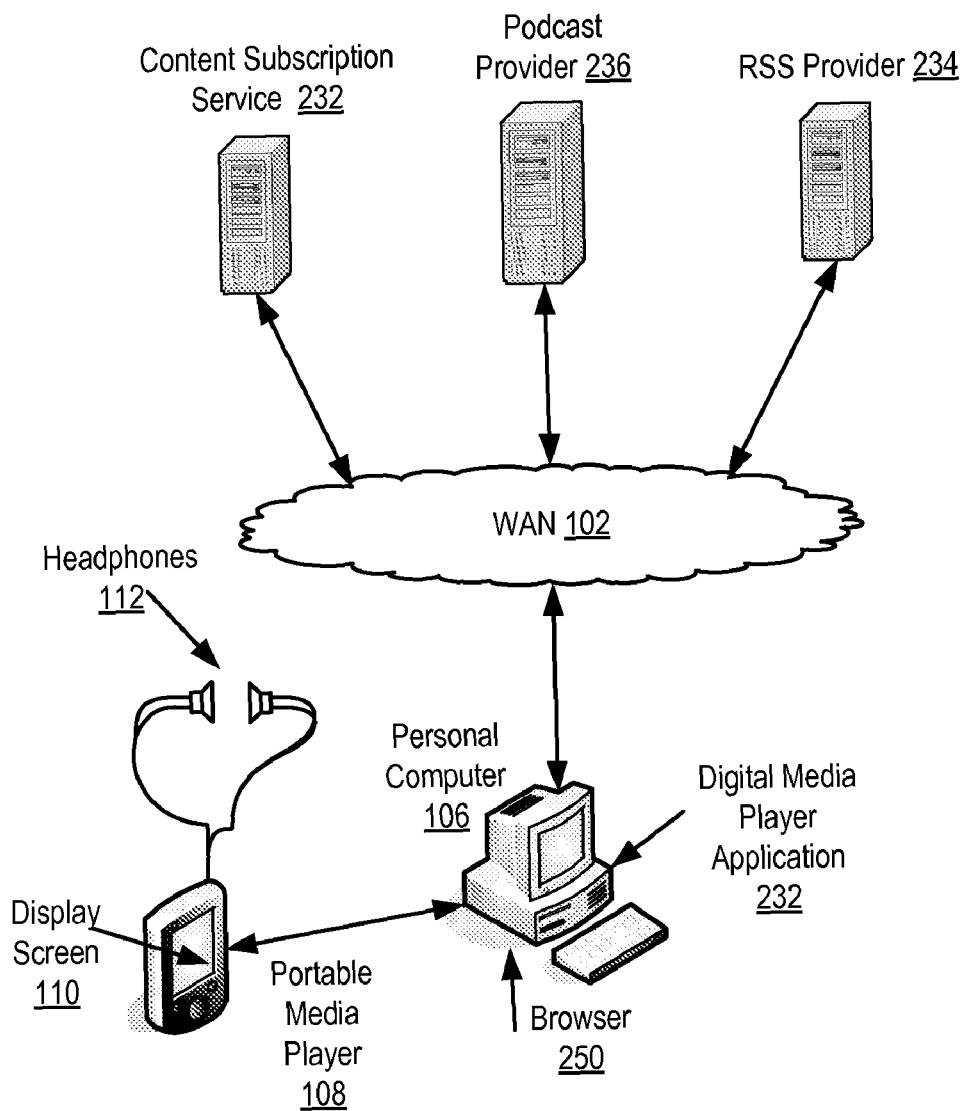
FIG. 1 sets forth a network diagram illustrating an exemplary system for content subscription according to embodiments of the present invention.

Exemplary methods, systems, and products for content subscription according to embodiments of the present invention are described with reference to the accompanying drawings, beginning with FIG. 1. FIG. 1 sets forth a network diagram illustrating an exemplary system for content subscription and token-based content subscription according to embodiments of the present invention.

The system of FIG. 1 operates generally for content subscription according to embodiments of the present invention by receiving from a user device configuration information; receiving from a user one or more identifications of content providers for delivery to a device; and instructing the one or more content providers to deliver content to the device associated with the device configuration information. The system of FIG. 1 also operates generally for token-based content subscription according to embodiments of the present invention by receiving a request for content subscription; receiving from a user a subscription token; and delivering content to a device associated with the subscription token.

The exemplary system of FIG. 1 includes a content subscription service (232). The exemplary content subscription service of FIG. 1 is an enterprise service capable of receiving from a user device configuration information; receiving from a user one or more identifications of content providers for delivery to a device; and instructing the one or more content providers to deliver content to the device associated with the device configuration information. The exemplary content subscription service of FIG. 1 is also capable of establishing a user account and issuing to a user a subscription token associated with the user account. A subscription token is mechanism for providing to a content provider information useful in subscribing to the content and that has already been provided by the user to the content subscription service issuing the token. Such a subscription token may be a token presented to a content provider by a user who in turn presents the token to the issuing content subscription service to retrieve content delivery information to deliver content. Alternatively, content delivery information may be embedded into the subscription token itself by a content subscription service such that content providers may extract the delivery information from the token The exemplary system of FIG. 1 includes two content providers: a podcast provider (236) and an RSS provider (234). Podcasting is the method of distributing multimedia files, such as audio programs or music videos, over the Internet for playback on mobile devices and personal computers. The term podcast, like "radio", can mean both the content and the method of delivery. The host or author of a podcast is often referred to as a "podcaster". A podcast provider may provide direct download of the podcast or streaming of the podcast.

RSS ('Really Simple Syndication') is a broad term describing a family of XML file formats for web syndication used by news websites, weblogs, and other content providers. The abbreviation is often used to refer to the following exemplary standards: Rich Site Summary (RSS 0.91), RDF Site Summary (RSS 0.9, 1.0 and 1.1), and Really Simple Syndication (RSS 2.0).

The exemplary content providers (234 and 236) and of FIG. 1 are capable of token-based content subscription according to embodiments of the present invention by receiving a request for content subscription; receiving from a user a subscription token; and delivering content to a device associated with the subscription token. The content providers (234 and 236) are capable of delivering content to a device associated with the subscription token by presenting the subscription token to the issuer; receiving in response to presenting the subscription token the content delivery information; and delivering content to a device in accordance with the content delivery information. The content providers (234 and 236) are capable of delivering content to a device associated with the subscription token by extracting from the token content delivery information; and delivering content to a device in accordance with the content delivery information.

The system of FIG. 1 includes a personal computer (106) having installed upon it a browser (250) empowering a user to view web pages such as those provided by a content subscription service and provided by subscription by the RSS provider (234). The personal computer (106) of FIG. 1 also has installed upon it a digital media player application (232) capable of receiving and managing podcasts provided by subscription from the podcast provider (236). A digital media player application is an application that manages media content such as audio files and video files. Such digital media player applications are typically capable of transferring media files to a portable media player. Examples of digital media player applications include Music Match™, iTunes®, Songbird™, and others as will occur to those of skill in the art.

The system of FIG. 1 also includes a portable media player (108). The portable media player of FIG. 1 is capable of playing media files such as for example, MPEG files, AAC compressed .mp4 files, and others provided by subscription by the podcast provider (236). The portable media player (108) of FIG. 1 also includes a display screen (110) capable of displaying information stored as metadata associated with media files of the file types supported by the portable media player. The portable media player also includes headphones (112) for audio rendering of media files supported by the portable media player.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Content subscription in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary content subscription service server (152) useful in content subscription according to embodiments of the present invention. The content subscription service server (152) of FIG. 2 includes at least one computer processor (156) or 'CPU' as well as random access memory (168) ('RAM') which is connected through a system bus (160) to processor (156) and to other components of the content subscription service server.

Stored in RAM (168) is a content subscription application (158) computer program instructions for content subscription capable of receiving from a user device configuration information; receiving from a user one or more identifications of content providers for delivery to a device; and instructing the one or more content providers to deliver content to the device associated with the device configuration information. The content subscription application (158) also includes computer program instructions for token-based content subscription capable of establishing a user account and issuing to a user a subscription token associated with the user account.

Also stored in RAM (168) is a web server (155), computer program instructions capable of serving up web pages to clients. Such web pages may be designed with graphical user interface ('GUI') input widgets designed to receive user security information and content delivery information such as device IDs and network addresses associated with devices capable of receiving content from a content provider.

Also stored in RAM (168) is an operating system (154). Operating systems useful in computers according to embodiments of the present invention include UNIX™, Linux™, Microsoft XP™, AIX™, IBM's i5/OS™, and others as will occur to those of skill in the art. Operating system (154), content subscription application (158) and web server (155) in the example of FIG. 2 are shown in RAM (168), but many components of such software typically are stored in non-volatile memory (166) also.

Figure 2:
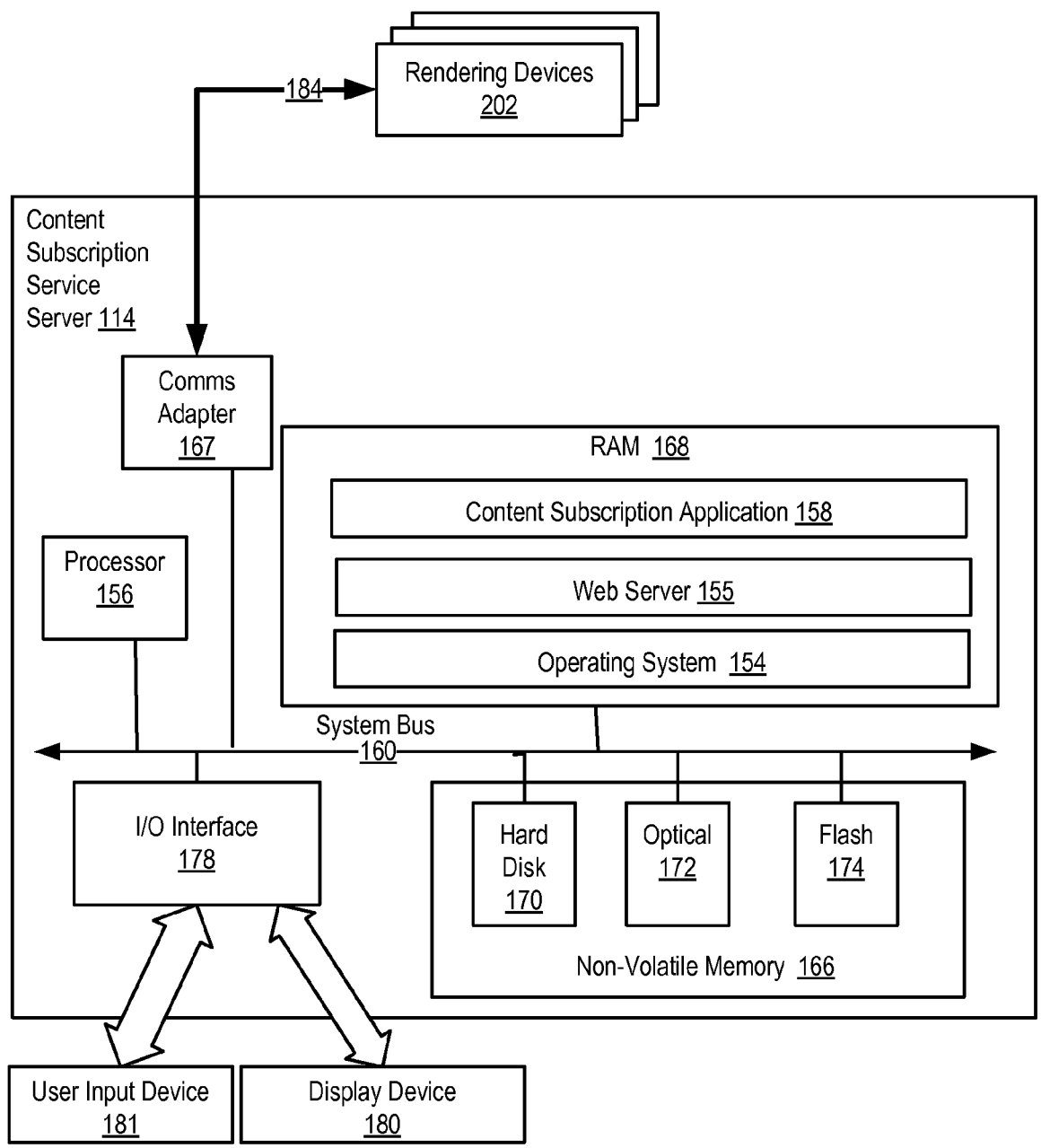
FIG. 2 sets forth a block diagram of automated computing machinery comprising an exemplary content subscription service server useful in content subscription according to embodiments of the present invention.

Content subscription service server (152) of FIG. 2 includes non-volatile computer memory (166) coupled through a system bus (160) to processor (156) and to other components of the content subscription service server (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example content subscription service server of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary content subscription service server (152) of FIG. 2 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for content subscription according to embodiments of the present invention include modems for wired dial-up communications, Ethernet (IEEE 802.3) adapters for wired network communications, and 802.11b adapters for wireless network communications.

Figure 3:
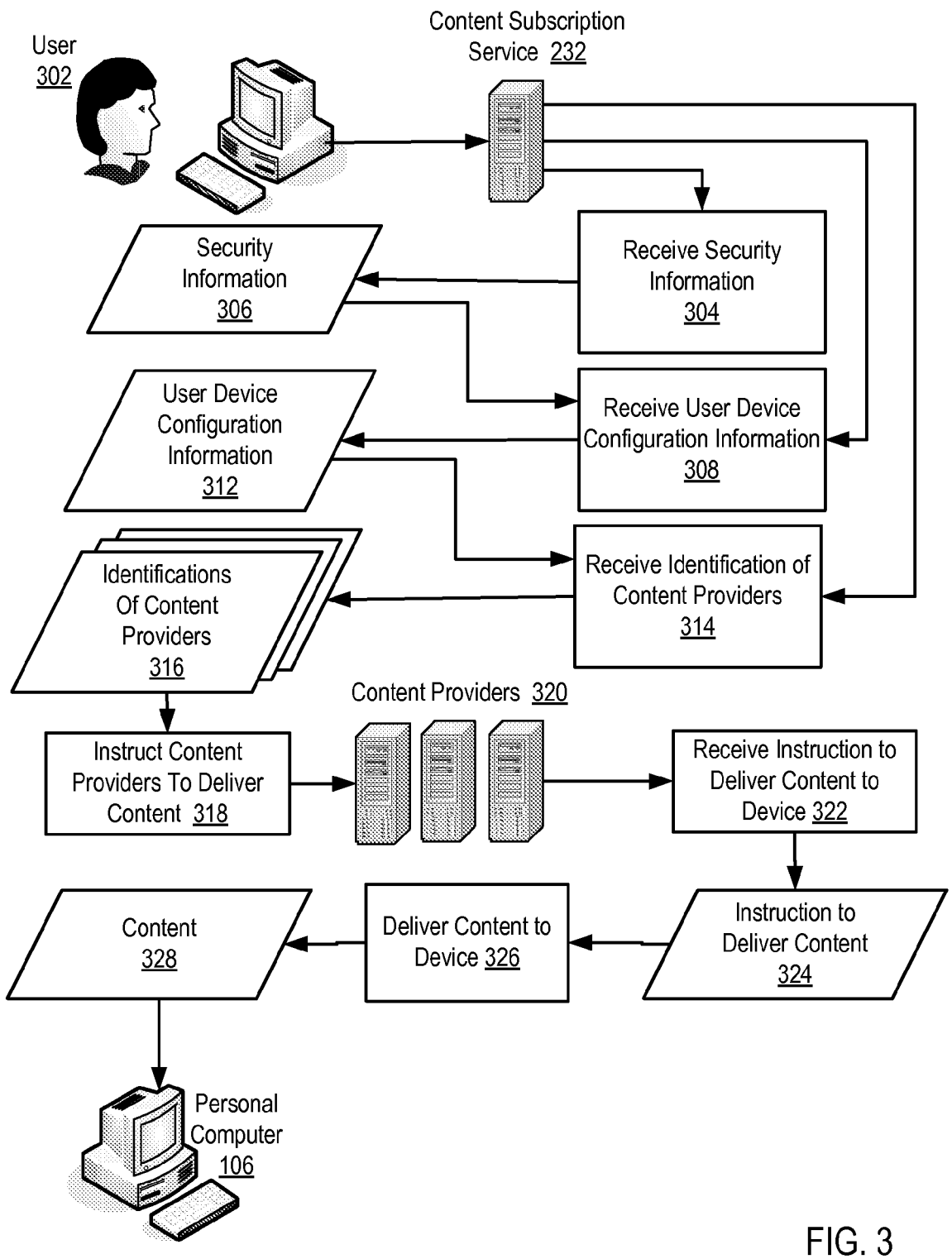
FIG. 3 sets forth a flow chart illustrating an exemplary method for content subscription according to embodiments of the present invention.

For further explanation, FIG. 3 sets forth a flow chart illustrating an exemplary method for content subscription according to embodiments of the present invention that includes receiving (304) from a user (302) security information (306). Security information is data used by a content subscription service (232) according to the present invention for among other things authentication of a user. Such security information may be used to authenticate a user having established a user account with a content subscription service.

Receiving (304) from a user (302) security information (306) according to the present invention may be carried out by receiving from a user a user ID and receiving from a user password. A user ID and password may be received from a user through for example web page provided by a content subscription service and accessible by a user through a browser. Such a web page may include GUI input widgets designed to receive from a user a user ID and password.

The method of FIG. 3 also includes receiving (308) from a user (302) device configuration information (312). Device configuration information is information necessary to identify a target device to deliver content and information useful in effecting the delivery of that content. Receiving from a user device configuration information according to the method of FIG. 3 may be carried out by receiving from a user a device ID identifying the target device for content delivery and receiving from a user a network address for delivery of the content. A device ID is a unique identification of a particular device identified for receiving content according to a subscription with a particular subscription provider.

The method of FIG. 3 also includes receiving (314) from a user (302) one or more identifications (316) of content providers for delivery to a device (106). A content provider is a provider of subscription content. That is, a provider of content that periodically delivers content to a device in accordance with a subscription with the user. Such content providers may be provider of RSS content, podcast content, video content, or any other content available through subscription with a content provider.

Receiving (314) from a user (302) one or more identifications (316) of content providers for delivery to a device (106) may be carried out by receiving a URL identifying a content provider through a web page provided by a content subscription service and accessible by a user with a browser. Such a web page may also be configured to accept a user's dragging and dropping a URL from the address bar of another open instance of a browser.

The method of FIG. 3 also includes instructing (318) the one or more content providers (320) to deliver content to the device (106) associated with the device configuration information (312). Instructing (318) the one or more content providers (320) to deliver content to the device (106) associated with the device configuration information (312) may be carried out by providing the security information to the content providers and providing the configuration information to the content providers necessary to deliver content to the identified target device.

The method of FIG. 3 also includes receiving (322) by a content provider (320) the instruction (324) to deliver content to the device (106). Receiving (322) by a content provider (320) the instruction (324) to deliver content to the device (106) may include receiving by the one or more content providers security information for a user and device configuration information necessary to deliver content to the target device.

Upon receiving an instruction to deliver content to the device, content providers may establish an account for the user for content subscription. Establishing an account for the user for content subscription may include saving security information for the user and device configuration information for the user in association with the user account. Establishing an account for the user may also include billing the user for the subscription of content.

The method of FIG. 3 also includes delivering (326) content (328) to the device (106) in response to the instruction (324). Delivering (326) content (328) to the device (106) in response to the instruction (324) may be carried out by pushing content to the identified device, pushing an aggregator to the identified device and having content pulled to the device by the aggregator, or any other method of delivering content to the device that will occur to those of skill in the art.

Content subscription services according to the present invention may advantageously maintain a user account for user such that the user may be required only once to provide security information and device configuration information for content subscription. Such a user account may therefore include user security information and user device configuration information.

A user account may also include user content presentation parameters. User content presentation parameters are preferences established by a user for presentation to one or more content providers such that subscriptions of content conform to the user presentation parameters. User content presentation parameters may include preferences for number of RSS items to include an RSS feed, the preferred period of content delivery, a preferred ordering of content, and others as will occur to those of skill in the art.

As discussed above, security information and device configuration information may be received through for example a web page provided by a subscription service and accessible by a user through a browser. For further explanation, therefore, FIG. 4 sets forth a block diagram of an exemplary web page (400) useful in content subscription according to the present invention. The exemplary web page of FIG. 4 is capable of receiving security information from a user and device configuration information from a user.

Figure 4:
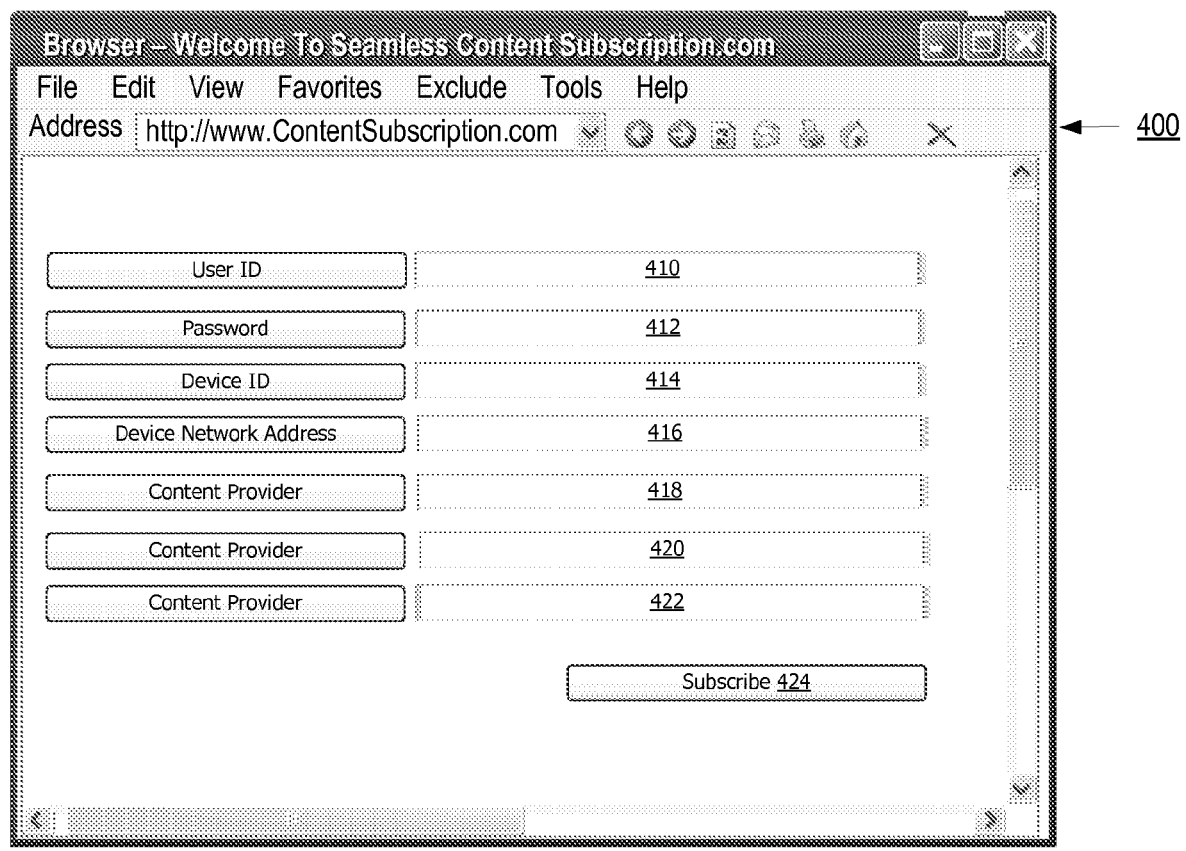
FIG. 4 sets forth a block diagram of an exemplary web page useful in content subscription according to the present invention.

The exemplary web page of FIG. 4 is capable of receiving security information from a user. The exemplary web page (400) includes a GUI input widget (410) capable of receiving from a user a user ID. The exemplary web page (400) of FIG. 4 also includes a GUI input widget (412) capable of receiving from a user a password.

The exemplary web page of FIG. 4 is capable of receiving device configuration information from a user. The exemplary web page (400) of FIG. 4 also includes a GUI input widget (414) capable of receiving from a user a device ID identifying the target device for content delivery. The exemplary web page (400) of FIG. 4 also includes a GUI input widget (416) for receiving a device network address identifying a network address to which subscription content may be deliver in accordance with the present invention.

The exemplary web page of FIG. 4 is capable of receiving identifications of one or more content providers. The exemplary web page (400) of FIG. 4 includes GUI input widgets (418, 420, 422) capable of receiving identifications, such as URLs, to content providers. Web pages such as the exemplary web page of FIG. 4 are often capable of receiving a URL dragged and dropped by use of mouse from an address bar of another instance of a web browser currently displaying a page associated with the URL.

The exemplary web page (400) useful in content subscription according to the present invention presented in FIG. 4 is for explanation and not for limitation. In fact, web pages useful in content subscription according to the present invention may designed in any number of ways as will occur to those of skill in the art and all such ways are well within the scope of the present invention.

The presentation of the content ultimately delivered by the content provider according to the content subscription of the present invention may also be customized according to content presentation parameters. For further explanation, therefore, FIG. 5 sets forth a block diagram of a content presentation customization page (500) useful in content subscription according to the present invention. The content presentation customization page (500) of FIG. 5 is capable of receiving from a user content presentation parameters.

Figure 5:
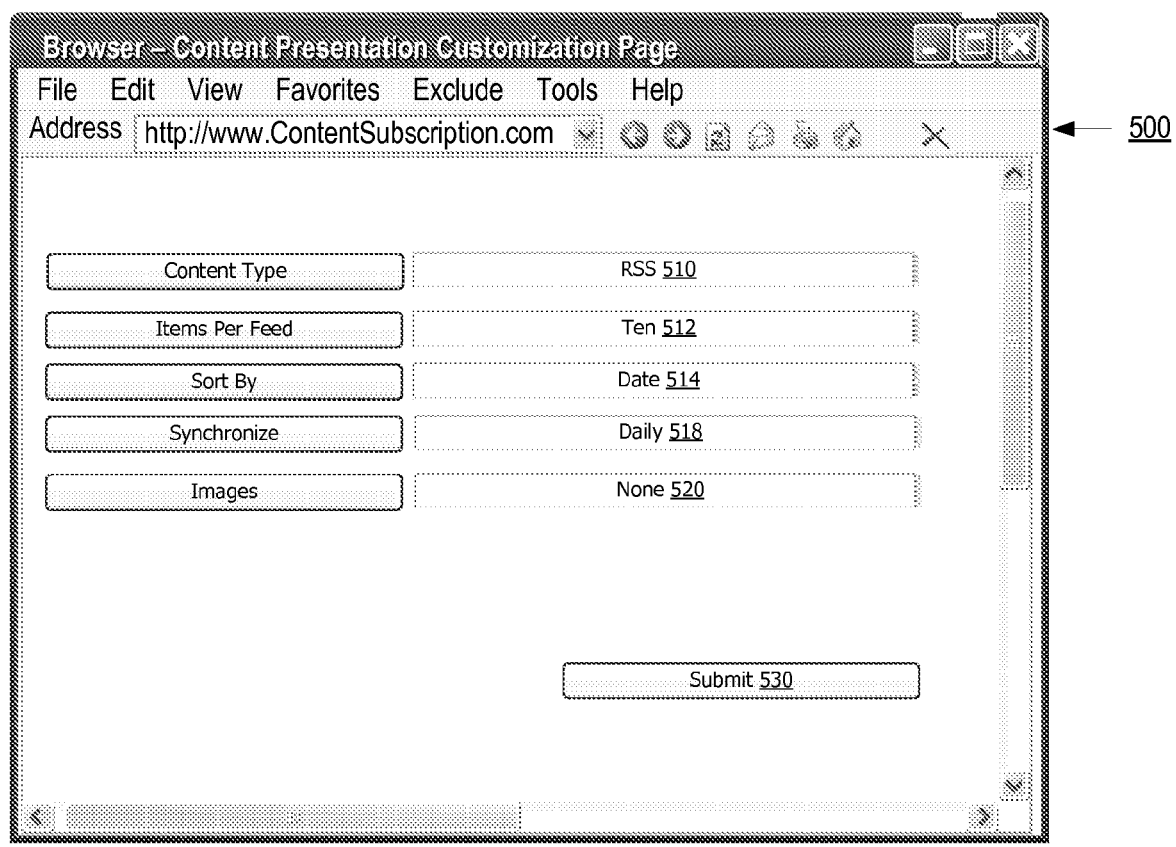
FIG. 5 sets forth a block diagram of a content presentation customization page useful in content subscription according to the present invention.

The exemplary content presentation customization page (500) of FIG. 5 includes a GUI input widget (510) for receiving an identification of a content type for which the user content presentation parameters apply. In the example of FIG. 5, the content type is identified as RSS content.

The content presentation customization page (500) of FIG. 5 includes a GUI input widget (512) for receiving an identification of the number of RSS items to be delivered with a particular RSS feed. In the example of FIG. 5, the number of RSS items so identified is ten.

The content presentation customization page (500) of FIG. 5 includes a GUI input widget (514) for receiving an identification of a preference for the sorting of items in the RSS feed. In the example of FIG. 5, the sorting preference indicates that RSS items are to be sorted by date.

The content presentation customization page (500) of FIG. 5 includes a GUI input widget (518) for receiving an identification of the frequency with which to synchronize or deliver content from the content provider. In the example of FIG. 5, the frequency for synchronization is daily.

The content presentation customization page (500) of FIG. 5 includes a GUI input widget (520) for receiving images preferences identifying whether images are to be delivered with content provided by the content provider. In the example of FIG. 5, the preferences indicate no images are to be provided.

Content subscription service having receiving from the user the content presentation parameters may store the presentation parameters in association with a user account and provide the content presentation parameters to the content subscription service.

The content presentation customization page (500) of FIG. 5 is presented for explanation and not for limitation. In fact, content presentation may be customized according to any number of content presentation parameters in many ways and all such was may be useful in content subscription according to the present invention.

Token-Based Content Subscription

As discussed above, content subscription services may usefully provide a token that may be presented to various content providers by a user for content subscription according to the present invention. For further explanation, therefore, FIG. 6 sets forth a flow chart illustrating an exemplary method for token-based content subscription according to the present invention. The method of FIG. 6 includes establishing (604) a user account (606). Establishing (604) a user account (606) according to the method of FIG. 6 may be carried out by receiving user security information and receiving content delivery information for a user and associating the user security information and content delivery information with an account for the user. As discussed above, user security information may include a user ID and password used to authenticate a user. Content delivery information may include device configuration parameters such as a device ID and network address and user content presentation parameters defining preferences for content delivery as discussed above.

Figure 6:
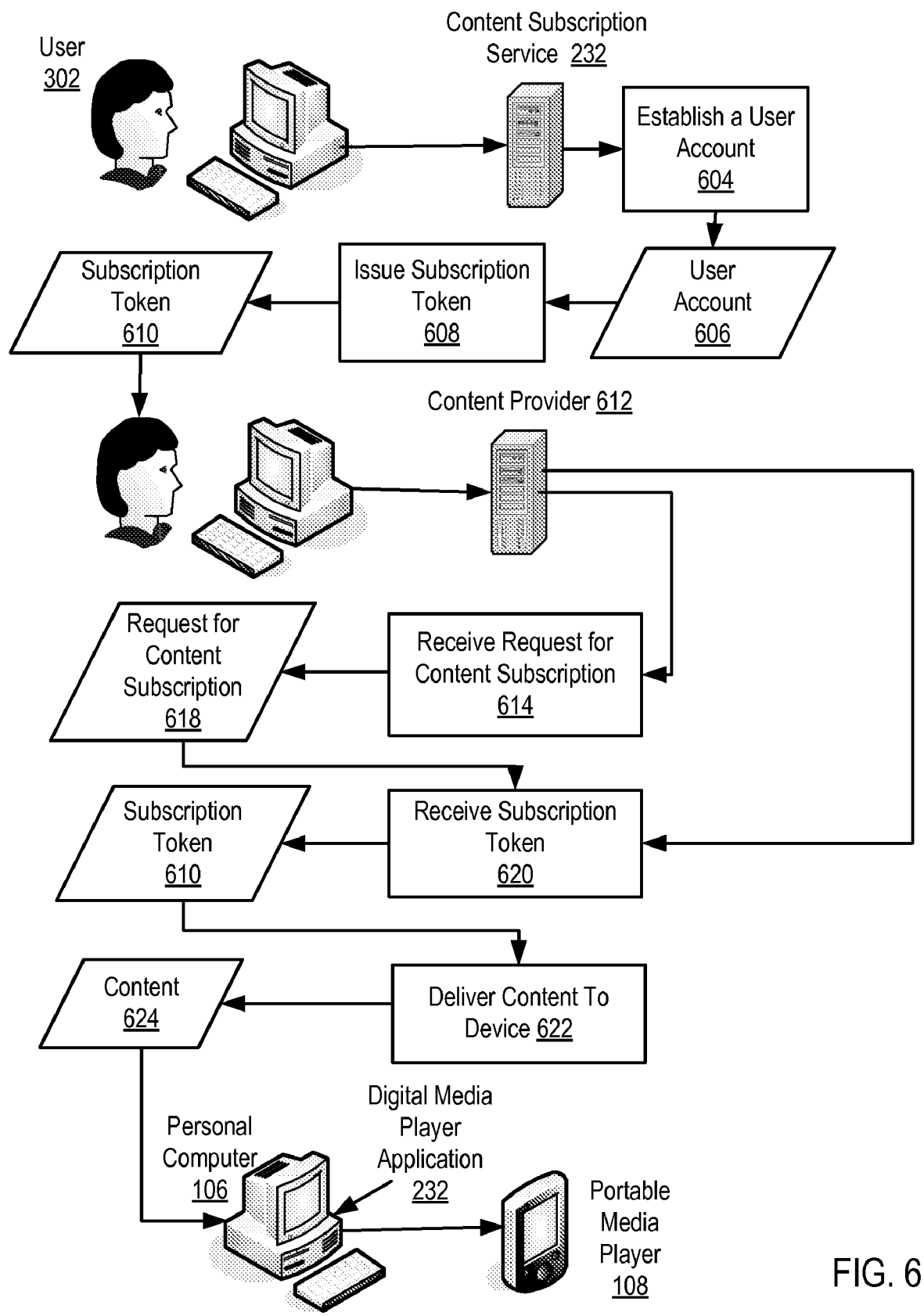
FIG. 6 sets forth a flow chart illustrating an exemplary method for token-based content subscription according to the present invention.

The method of FIG. 6 includes issuing (608) to a user (302) a subscription token (610) associated with the user account (610). A subscription token is mechanism for providing to a content provider information useful in subscribing to the content and that has already been provided by the user to the content subscription service issuing the token. Such a token may be presented to a content provider who in turn presents the token to the issuing content subscription service to retrieve content delivery information to deliver content. Such a subscription token may be implanted as an XML-based subscription token. For further explanation, consider the following XML-based subscription token.

```
<subscription token ID = 411234>
    <security token issuer = Http://someSubscriptionSerice.com>
</subscription token ID >
```

The exemplary subscription token above has a unique subscription token identification of '411234.' The exemplary subscription token identifies the issuer of the subscription token with a universal resource locator ('URL') Http://someSubscriptionSerice.com. The URL may be invoked by a content provider with the subscription token ID to retrieve from the subscription token issued content delivery information useful by a content provider to deliver content to a user.

Alternatively, issuing (608) to a user (302) a subscription token (608) associated with the user account (606) may include embedding within the subscription token content delivery information. That is, delivery information may be embedded into the subscription token itself by a content subscription service such that content providers may extract the delivery information from the token. A subscription token having embedded content delivery information may be implemented as an XML-based token. For further explanation, consider the following exemplary subscription token:

```
<subscription token ID = 11234>
    <security information>
        <user ID = Joe>
        <password = somePassword>
    </security information>
    <content delivery information>
        <device ID= SomeDeviceNo1233333>
        <networkAddress=192.168.1.35192.168.1.35>
    </content delivery information>
</subscription token ID >
```

The exemplary XML-based subscription token above has a unique subscription token ID of '1234.' The exemplary XML-based subscription token above has embedded within it security information for the user defining a user ID of 'Joe' for the user and a password for the user of 'somePassword.' The exemplary XML-based subscription token above also has embedded within it content delivery information identifying a target device for delivering content as a device having an identification of 'SomeDeviceNo1233333' that is capable of receiving content at the IP network address '192.168.1.35192.168.1.35'

The method of FIG. 6 includes receiving (614) a request (618) for content subscription and receiving (620) from a user (302) a subscription token (610). In the example of FIG. 6, a content provider receives a request (618) for content subscription. Such a request for content subscription may be received, for example, through the content providers web site designed to receive from a user a request for content subscription and receive from the user a subscription token.

The method of FIG. 6 includes delivering (622) content (624) to a device (106) associated with the subscription token (610). Delivering content to a device associated with the subscription token may be carried out by presenting the subscription token to the issuer, receiving in response to presenting the subscription token the content delivery information; and delivering content to a device in accordance with the content delivery information as discussed below with reference to FIG. 7. Delivering content to a device associated with the subscription token may also be carried out by extracting from the token content delivery information and delivering content to a device in accordance with the content delivery information.

As discussed above, delivering content to a device associated with a subscription token may be carried out by content provider presenting a subscription token received from a user to the issuer of the subscription token. For further explanation, therefore, FIG. 7 sets forth a flow chart illustrating an exemplary method for delivering content to a device associated with the subscription token further comprises that includes presenting (702) the subscription token (610) to the issuer (702). As discussed above, a subscription token may be an XML-based subscription token. Consider again the following XML based subscription token.

```
<subscription token ID = 411234>
    <security token issuer = Http://someSubscriptionService.com>
< /subscription token ID >
```

The exemplary subscription token above has a unique subscription token identification of '411234.' The exemplary subscription token identifies the issuer of the subscription token with a universal resource locator ('URL') Http://someSubscriptionService.com. Presenting the exemplary subscription token to the issuer according to the method of FIG. 7 may be carried out by invoking the URL 'Http://someSubscriptionService.com' contained in the subscription token and providing the subscription token ID to the subscription service through the URL.

Figure 7:
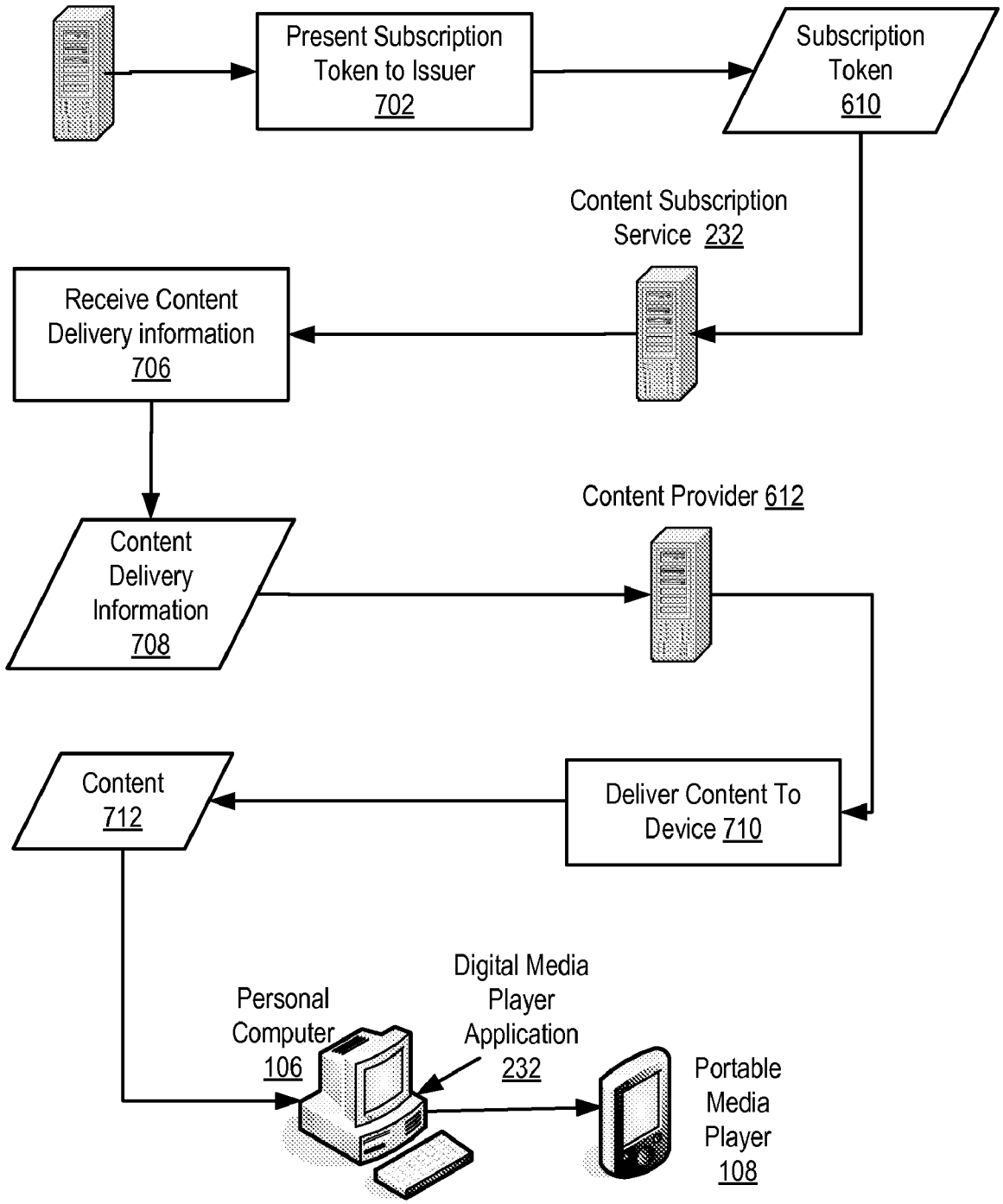
FIG. 7 sets forth a flow chart illustrating an exemplary method for delivering content to a device associated with the subscription token further comprises that includes presenting the subscription token to the issuer.

The method of FIG. 7 also includes receiving (706) in response to presenting the subscription token (610) the content delivery information (706). In response to presenting the subscription token (610) a content subscription service may retrieve from a user account the content delivery information associated with the subscription token and provide to the content provider the content delivery information (706) associated with the subscription token.

The method of FIG. 7 also includes delivering (710) content (712) to a device (106) in accordance with the content delivery information (708). In the example of FIG. 7, delivering (710) content (712) to a device (106) in accordance with the content delivery information (708) is carried out by a content provider having received the content delivery information from the subscription service issuing the subscription token. Delivering (710) content (712) to a device (106) in accordance with the content delivery information (708) may be carried out by delivering content to a device identified by a device ID received from the content subscription service at a network address received from the content subscription service. Delivering (710) content (712) to a device (106) in accordance with the content delivery information (708) may also include delivering content in accordance with content presentation parameters defined in the content delivery information received from the content subscription service.

As discussed above, subscription tokens may have content delivery information embedded within the token. For further explanation, therefore, FIG. 8 sets forth another exemplary method for delivering content to a device associated with the subscription token. The method of FIG. 8 includes extracting (802) from the token (610) content delivery information (804). A subscription token may be an XML-based subscription token. For further explanation, consider again the following XML-based subscription token.

```
<subscription token ID = 11234>
    <security information>
        <user ID = Joe>
        <password = somePassword>
    </security information>
    <content delivery information>
        <device ID= SomeDeviceNo1233333>
        <networkAddress=192.168.1.35192.168.1.35>
    </content delivery information>
< /subscription token ID >
```

The exemplary XML-based subscription token above has a unique subscription token ID of '1234.' The exemplary XML-based subscription token above has embedded within it security information for the user defining a user ID of 'Joe' for the user and a password for the user of 'somePassword.' The exemplary XML-based subscription token above also has embedded within it content delivery information identifying a target device for delivering content as a device having an identification of 'SomeDeviceNo1233333' that is capable of receiving content at the IP network address '192.168.1.35192.168.1.35'. Extracting from the exemplary subscription token content delivery information according to the method of FIG. 8 may be carried out by identifying the <content delivery information> tag in the subscription token and extracting the device ID and network address identified by the <content delivery information> tag.

Figure 8:
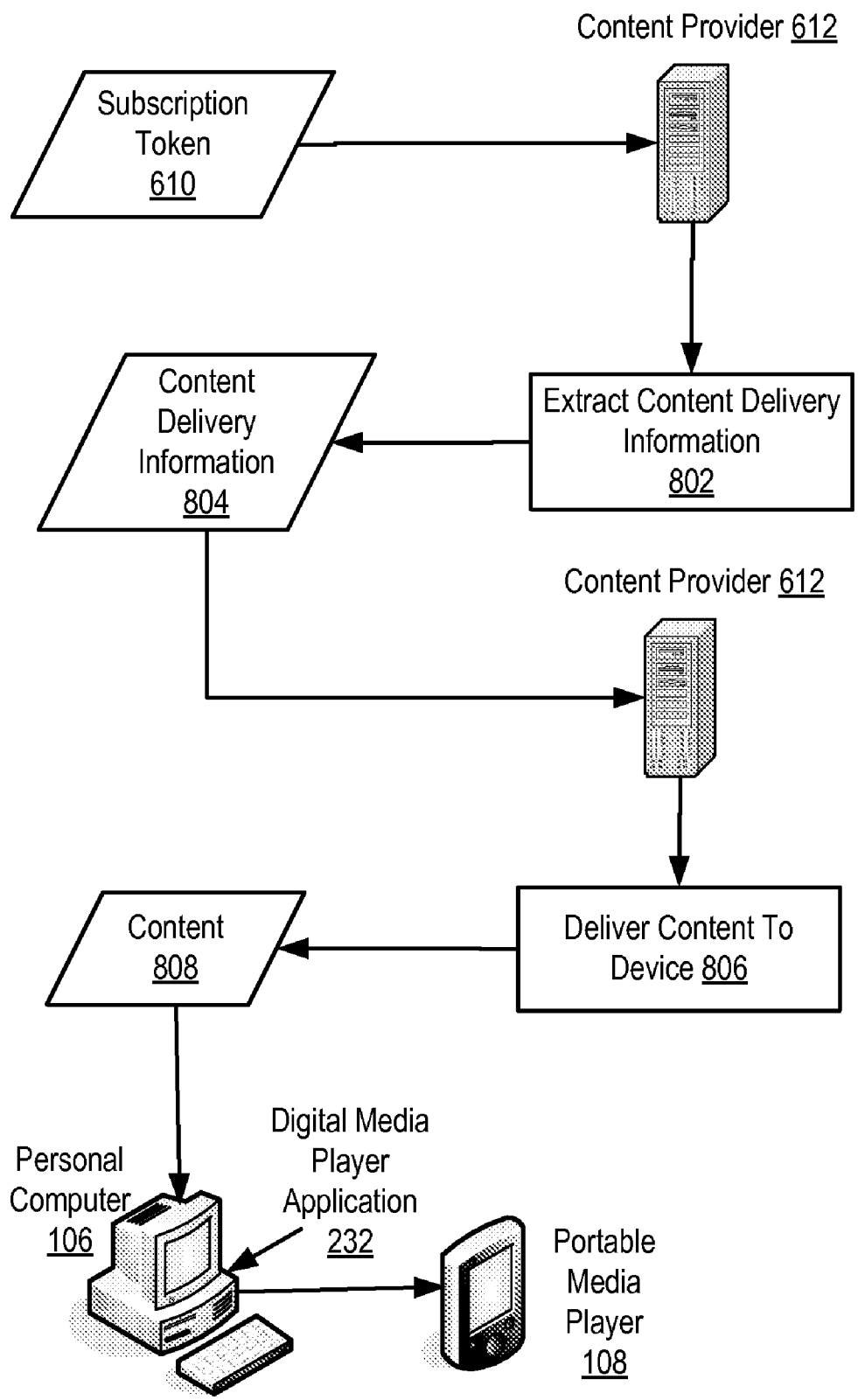
FIG. 8 sets forth another exemplary method for delivering content to a device associated with the subscription token that includes extracting from the token content delivery information.

The method of FIG. 8 also includes delivering (806) content (808) to a device (106) in accordance with the content delivery information (804). Delivering (806) content (808) to a device (106) in accordance with the content delivery information (804) may be carried out by delivering content to a device identified by a device ID in the subscription token capable of accepting content at a network address identified in the subscription token. Delivering (806) content (808) to a device (106) in accordance with the content delivery information (804) may also include delivering content in accordance with content presentation parameters defined in the content delivery information.

Exemplary embodiments of the present invention are described largely in the context of a fully functional computer system for content subscription. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for token-based content subscription, the method comprising:
   receiving, by a content provider a request for content subscription;
   receiving, by the content provider, a subscription token, the subscription token provided to a user by a content subscription service and including security information and content delivery information, the content delivery information including a preferred period for the content subscription, a frequency for the content subscription, a preferred sorting order for the content, and further including content presentation parameters that indicate a preference for presentation of subscription content to a device associated with the subscription token; and
   delivering, by the content provider, the content to the device associated with the subscription token, including:
      extracting from the subscription token the security information;
      extracting from the subscription token the content delivery information; and
      delivering the content to the device in accordance with the content delivery information and the security information, including periodically pushing content to the device.

2. The method of claim 1 further comprising:
   establishing a user account; and
   issuing to a user a subscription token associated with the user account.

3. The method of claim 2 wherein establishing the user account further comprises:
   receiving user security information; and
   receiving content delivery information for the user.

4. The method of claim 2 wherein issuing to the user a subscription token associated with the user account further comprises embedding within the subscription token content delivery information.

5. The method of claim 1 wherein delivering content to a device associated with the subscription token further comprises:
   presenting the subscription token to the issuer;
   receiving in response to presenting the subscription token the content delivery information; and
   delivering content to a device in accordance with the content delivery information.

6. A system for token-based content subscription, the system comprising:
   a computer processor;
   a computer memory operatively coupled to the computer processor, the computer memory having disposed within it computer program instructions capable of:
   receiving, by a content provider a request for content subscription;
   receiving, by the content provider, a subscription token, the subscription token provided to a user by a content subscription service and including security information and content delivery information, the content delivery information including a preferred period for the content subscription, a frequency for the content subscription, a preferred sorting order for the content, and further including content presentation parameters that indicate a preference for presentation of subscription content to a device associated with the subscription token; and
   delivering, by the content provider, the content to the device associated with the subscription token, including:
      extracting from the subscription token the security information;
      extracting from the subscription token the content delivery information; and
      delivering the content to the device in accordance with the content delivery information and the security information, including periodically pushing content to the device.

7. The system of claim 6 further comprising:
   another computer processor;
   another computer memory operatively coupled to the another computer processor, the computer memory having disposed within it computer program instructions capable of
   establishing a user account; and
   issuing to a user a subscription token associated with the user account.

8. The system of claim 7 wherein computer program instructions capable of establishing the user account further comprise computer program instructions capable of:
   receiving user security information; and
   receiving content delivery information for the user.

9. The system of claim 7 wherein computer program instructions capable of issuing to the user a subscription token associated with the user account further comprise computer program instructions capable of embedding within the subscription token content delivery information.

10. The system of claim 6 wherein computer program instructions capable of delivering content to a device associated with the subscription token further comprise computer program instructions capable of: presenting the subscription token to the issuer; receiving in response to presenting the subscription token the content delivery information; and delivering content to a device in accordance with the content delivery information.

11. A computer program product for token-based content subscription, the computer program product embodied on a non-transmission computer-readable recording medium, the computer program product comprising:
   computer program instructions for receiving, by a content provider, a request for content subscription;
   computer program instructions for receiving, by the content provider, a subscription token, the subscription token provided to a user by a content subscription service and including security information and content delivery information, the content delivery information including a preferred period for the content subscription, a frequency for the content subscription, a preferred sorting order for the content, and further including content presentation parameters that indicate a preference for presentation of subscription content to a device associated with the subscription token; and
   computer program instructions for delivering, by the content provider, the content to a device associated with the subscription token, including:
      computer program instructions for extracting from the subscription token the security information;
      computer program instructions for extracting from the subscription token the content delivery information; and
      computer program instructions for delivering the content to the device in accordance with the content delivery information and the security information, including periodically pushing content to the device.

12. The computer program product of claim 11 further comprising:
   computer program instructions for establishing a user account; and
   computer program instructions for issuing to the user a subscription token associated with the user account.

13. The computer program product of claim 12 wherein computer program instructions for establishing the user account further comprise:
   computer program instructions for receiving user security information; and
   computer program instructions for receiving content delivery information for the user.

14. The computer program product of claim 12 wherein computer program instructions for issuing to a user a subscription token associated with the user account further comprise computer program instructions for embedding within the subscription token content delivery information.

15. The computer program product of claim 11 wherein computer program instructions for delivering content to a device associated with the subscription token further comprise:
   computer program instructions for presenting the subscription token to the issuer;
   computer program instructions for receiving in response to presenting the subscription token the content delivery information; and
   computer program instructions for delivering content to a device in accordance with the content delivery information.

16. The method of claim 1 wherein the content is RSS content delivered in an RSS feed; and
   wherein the content presentation parameters specify at least one preference for presentation of the subscription content selected from a group consisting of a preferred number of RSS items to include in the RSS feed, a preferred period of delivery for the RSS feed, a preferred method of sorting the RSS items in the RSS feed, and a preference for whether or not to deliver images as part of the RSS feed.

17. The system of claim 6 wherein the content is RSS content delivered in an RSS feed; and
   wherein the content presentation parameters specify at least one preference for presentation of the subscription content selected from a group consisting of a preferred number of RSS items to include in the RSS feed, a preferred period of delivery for the RSS feed, a preferred method of sorting the RSS items in the RSS feed, and a preference for whether or not to deliver images as part of the RSS feed.

18. The computer program product of claim 11 wherein the content is RSS content delivered in an RSS feed; and
   wherein the content presentation parameters specify at least one preference for presentation of the subscription content selected from a group consisting of a preferred number of RSS items to include in the RSS feed, a preferred period of delivery for the RSS feed, a preferred method of sorting the RSS items in the RSS feed, and a preference for whether or not to deliver images as part of the RSS feed.

19. The method of claim 1, wherein the subscription token is provided to the content provider from a content subscription service based on information from the user.

20. The method of claim 1, wherein the subscription token is provided to the content provider from the user, the subscription token having been created by a content subscription service based on information from the user; and
   wherein the frequency is either a delivery frequency specifying a rate at which the content will be delivered from the content provider or a synchronization frequency specifying a rate at which the content will be synchronized with the content of the content provider.

21. The system of claim 6, wherein the subscription token is provided to the content provider from a content subscription service based on information from the user.

22. The system of claim 6, wherein the subscription token is provided to the content provider from the user, the subscription token having been created by a content subscription service based on information from the user; and
   wherein the frequency is either a delivery frequency specifying a rate at which the content will be delivered from the content provider or a synchronization frequency specifying a rate at which the content will be synchronized with the content of the content provider.

23. The computer program product of claim 11, wherein the subscription token is provided to the content provider from a content subscription service based on information from the user.

24. The computer program product of claim 11, wherein the subscription token is provided to the content provider from the user, the subscription token having been created by a content subscription service based on information from the user; and
   wherein the frequency is either a delivery frequency specifying a rate at which the content will be delivered from the content provider or a synchronization frequency specifying a rate at which the content will be synchronized with the content of the content provider.

* * * * *